June 10, 1969

R. G. EGGERS ET AL 3,448,634

VEHICLE CONTROL FOOT PEDAL

Filed Oct. 20, 1967

INVENTORS
ROBERT G. EGGERS
ARTHUR F. GRANT

BY

ATTORNEYS

3,448,634
VEHICLE CONTROL FOOT PEDAL
Robert G. Eggers, Eastlake, and Arthur F. Grant, East Cleveland, Ohio, assignors to Towmotor Corporation, Cleveland, Ohio, a corporation of Ohio
Filed Oct. 20, 1967, Ser. No. 676,962
Int. Cl. G05g 1/14
U.S. Cl. 74—560  1 Claim

ABSTRACT OF THE DISCLOSURE

A foot pedal for use on a vehicle which has a forward and reverse drive and variable speeds. Both drives are controlled by a single pedal actuated linkage wherein toe pressure causes and controls forward drive and heel pressure causes and controls reverse drive and the configuration of the pedal is such as to accommodate the entire foot or to enable actuation by the heel alone, or by the toe alone.

---

Figure 1:
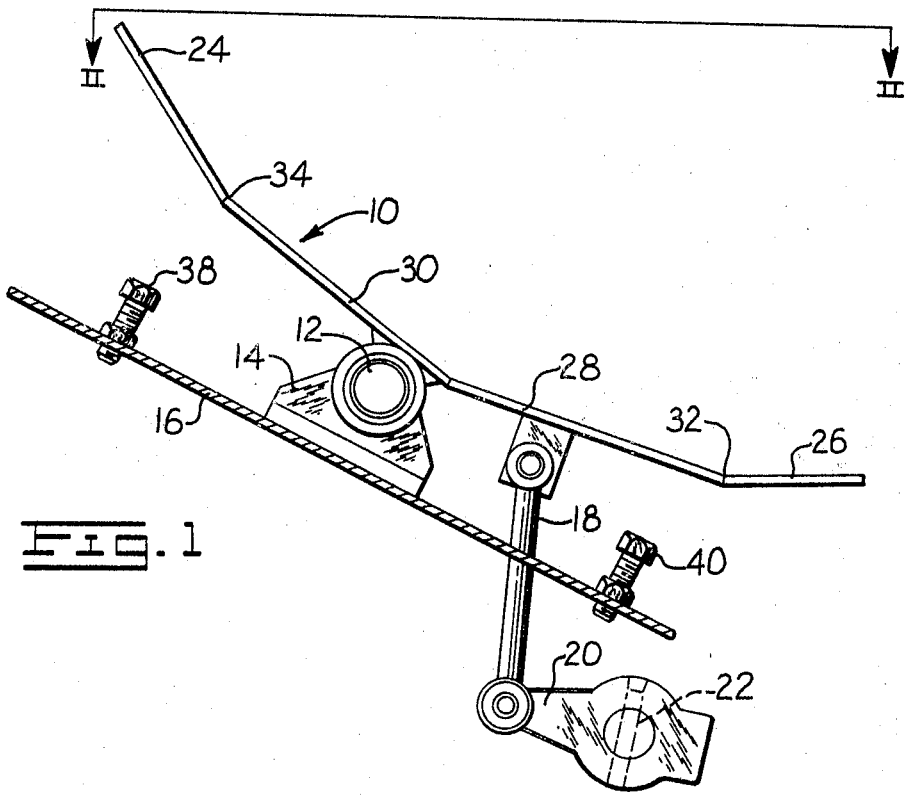

Difficulties encountered with pedals designed to actuate a transmission as well as to vary speed include principally operator fatigue caused by using one foot in a single position over long periods of time. For example, where forward or toe actuated motion causes forward drive, and rearward or heel actuation causes reverse drive and continued actuation in either direction increases the vehicle speed, the operator's foot generally occupies the same position for several hours, or a full working shift. Where hydrostatic power transmission is employed, the same pedal may be used for braking and inching of the vehicle so that operator fatigue is great.

It is an object of the present invention to provide a pedal which reduces operator fatigue by enabling the operator to perform certain operations with his foot in considerably different positions. A further object is to provide a pedal configuration which enables the operator to feel the position of his foot with respect to the pedal without looking downwardly to see it.

Another object is to provide a pedal configuration which enables the operator to achieve improved controllability for close or delicate maneuvering of the vehicle by means of supporting and therefore steadying either the toe or heel portion of the operator's foot on the floor while the opposite portion is used to operate the pedal. This is important because with both portions of the foot moving simultaneously, as with pedals permitting rocking motion only, some operators experience extreme difficulty in achieving satisfactory control.

Other objects and advantages are made apparent in the following specification wherein the invention is described by reference to the accompanying drawings.

Figure 2:
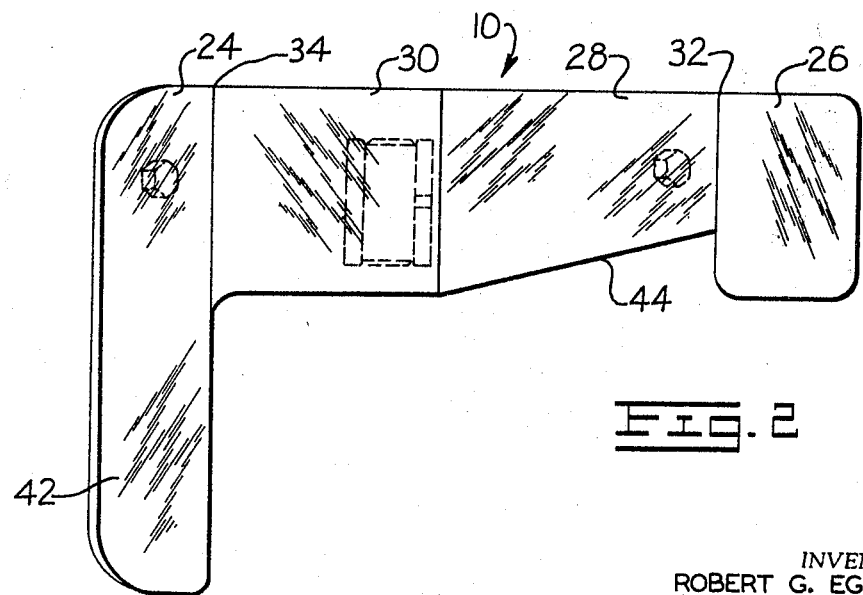

In the drawing:

FIG. 1 is a view in side elevation of an operator's pedal embodying the present invention; and FIG. 2 is a plan view of the same pedal.

In FIGS. 1 and 2, the foot supporting plate of the pedal of the present invention is generally indicated at 10 as supported on a pivot pin 12 which is carried by a bracket 14 mounted as shown in FIG. 1 on the deck plate of a vehicle, a portion of which is illustrated at 16. The bottom of the plate 10 is connected as by a pivoted link 18 to a lever 20 on a shaft 22; thus a forward movement of the plate 10 under toe pressure will swing the lever 20 upwardly, and rearward movement as by heel pressure will swing the lever downwardly.

The lever actuates means not shown for the purpose of shifting a hydrostatic transmission or the like between forward and reverse drive positions and also in controlling the position of the transmission elements for varying the speed in either forward or reverse drive. These are well-known features in existing transmissions and any further description of these features is unnecessary for an understanding of the present invention.

Referring in further detail to the configuration of the foot plate 10 and by reference to both FIGS. 1 and 2, the plate comprises a toe panel 24, a heel panel 26 and interconnecting panels 28 and 30 connected as by abrupt angular bends at 32 and 34 respectively, with the heel and toe panels. The forward rocking or toe actuated movement of the pedal is limited by an adjustable stop 38 in the floor plate 16 and rearward rocking movement is similarly limited by an adjustable stop 40. The stops therefore limit movement of the pedal in both the forward and reverse direction.

The specific foot pedal herein disclosed was designed for a fork lift truck where frequently alternating forward and reverse driving is often necessary, although on occasions a load might be transported for considerable distances in either direction. During frequent changes of direction the operator will undoubtedly prefer to have his foot placed toward the righthand side of the pedal which would be the upper side as viewed in FIG. 2; thus, his toe will be in position to depress the panel 24 and his heel in position to depress the panel 26. It has been demonstrated that constant operation of the foot in this position with substantially all motion taking place at the ankle joint is considerably more tiring than with frequent changes of position where the foot can pivot about the heel or the toe. As a consequence of the configuration of the pedal several different positions may be occupied by the foot. For example, driving forwardly for any period of time would justfy moving the foot toward the left where the extended portion 42 of the toe panel 24 may be utilized with the operator's heel resting on the floor adjacent the heel panel 26. Similarly, for continued reverse driving, the operator's toe may be moved to a position just leftward of the panel 30 while his heel remains on the panel 26. To enable convenient positioning of the foot as last described, one side of the panel 28 is cut away at an angle as indicated at 44. A still further position is possible for reverse driving where the operator moves his foot away from the pedal until his toe rests on the heel or reverse panel 26. Since the operator will in changing positions have occasion to move his foot forwardly or rearwardly on the pedal, proper positioning may be felt because of the angular connections 32 and 34 between the heel and toe panels.

When the position of an operator's foot is adjusted about the rear point of his heel or the forward point of his toe, motion takes place through all joints, including the angle and knee, but stopping at the hip. To the contrary, when motion is imparted to the foot about the ankle joint, the upper parts of the leg are not involved and fatigue is greater; thus, with the present pedal construction which enables different positioning for operation, fatigue is greatly reduced.

What is claimed is:

1. A foot pedal for use on a vehicle in which a single pedal controls forward direction and speed by toe actuated rocking movement and rear direction and speed by heel actuated rocking movement, all about a common horizontal pivot, comprising a pedal plate, a heel panel on said plate, a toe panel on said plate which is substantially wider than the plate and the heel panel to support the toe of an operator's foot with the heel disposed to one side of the pedal plate, said pedal forwardly of the heel panel being cut away to enable the operator's toe to be disposed to one side while his heel is on the heel panel, and the toe panel being disposed at an upward forward angle and the heel panel being disposed at an upward rearward angle with respect to the plate, to enable the operator to feel the position of his foot on the plate, said toe panel, plate and heel panel constituting a continuous surface.

References Cited
UNITED STATES PATENTS

| | | | |
|---|---|---|---|
| 520,072 | 5/1894 | McKee | 74—560 XR |
| 1,476,578 | 12/1923 | Ballak | 74—512 |
| 2,532,861 | 12/1950 | Siever | 74—513 XR |

OTHER REFERENCES

Indian Spring Frame motorcycles, p. 10.
Photograph of left side of Indian dispatch tow model DT-29.

FRED C. MATTERN, JR., *Primary Examiner.*

F. D. SHOEMAKER, *Assistant Examiner.*